Patented Mar. 25, 1947

2,417,804

UNITED STATES PATENT OFFICE 2,417,804

STABLE IODIZED CALCIUM PHOSPHATE

Howard Adler, Flossmoor, Ill., assignor to Victor Chemical Works, a corporation of Illinois No Drawing. Application September 12, 1941, Serial No. 410,630

4 Claims. (Cl. 23—108)

This invention relates to a stable iodized calcium phosphate and a method of preparing the same.

It is the common practice in the United States to add potassium iodide to table salt and certain other granular food chemicals in order to provide a source of iodine in the commodity. Potassium iodide, however, decomposes slowly, liberating iodine which frequently causes an undesirable discoloration of the product.

Ordinary commercial tricalcium phosphate—$3Ca_3(PO_4)_2.Ca(OH)_2$—is sometimes used for conditioning table salt or other granular chemical materials. The addition of the ordinary tricalcium phosphate, however, in combination with potassium iodide, particularly in the presence of common salt, does not stabilize potassium iodide. On the contrary the salt will turn to a yellowish brown color within a few days under ordinary atmospheric storage conditions when as little as 0.02% potassium iodide is present.

It has now been discovered, however, that a basic tricalcium phosphate may be prepared which is inherently more alkaline than the normal commercial product, and which may be intimately mixed with potassium iodide even in the presence of salt and other food chemicals without generation of iodine. The basic tricalcium phosphate may be prepared by reacting a dilute solution of phosphoric acid with a weak milk of lime slurry, employing a sufficient excess of the milk of lime to give the reaction mixture a pH value (based upon a 1% slurry) above 8.0 and preferably about 10.0. Under these conditions the precipitated basic tricalcium phosphate will have a composition approaching $Ca_3(PO_4)_2.Ca(OH)_2$. In other words, the ratio of OH radical to $P_2O_5$ approaches approximately 2 to 1. In ordinary hydroxy tricalcium phosphate the ratio is 2 to 3. The basic tricalcium phosphate is a substance having sufficient excess OH groups to provide a pH value above 8.0 and approaching the compound $CA_3(PO_4)_2.Ca(OH)_2$.

The OH groups may be supplied in part at least by caustic soda. For example, phosphoric acid and milk of lime may be reacted in proportions to give tricalcium phosphate having a pH value of about 7.0, after which sufficient caustic soda is added to give the mixture a pH value above 8.0.

In either case the precipitated basic tricalcium phosphate is filtered off, dried, and milled to pass through a 200 mesh or smaller screen.

The product is then thoroughly mixed with a small proportion, generally less than 10%, of finely milled potassium iodide. A preferred composition contains approximately 97% to 99% of the basic tricalcium phosphate, and 3% to 1% of potassium iodide. This composition is preferably for use with ordinary table salt since it may be employed in amounts sufficient not only to condition the salt to give it free-flowing qualities but to introduce at the same time a suitable amount of iodide. Normally the ratio of the basic tricalcium phosphate-potassium iodide mixture to the salt is about 0.5% to 1%. Generally not over 3% tricalcium phosphate is required to make the product free flowing. The ratio of potassium iodide to tricalcium phosphate is adjusted so that when enough tricalcium phosphate is used to make the product free flowing, the proportion of iodide to salt will be proper.

For example, a granular table salt was prepared by including 0.5% of basic tricalcium phosphate-potassium iodide mixture in which the ratio of OH groups to $P_2O_5$ groups was approximately 5 to 3, and the proportion of potassium iodide 2% of the complex. After a storage period of three months, the salt mixture showed no discoloration or other evidence of iodide decomposition.

On the other hand, a mixture prepared with the same salt using 0.5% of ordinary tricalcium phosphate having an OH-to-$P_2O_5$ ratio of approximately 2 to 3, and a pH of approximately 7, and containing 2% of potassium iodide, developed a distinctly brownish color after three days and emitted a strong iodine odor.

In order to effect its stabilizing action, basic tricalcium phosphate must be intimately admixed with the potassium iodide. Whether a chemical reaction occurs between them has not yet been ascertained.

The new product has improved properties of stabilization as compared with a normal tricalcium phosphate to which sodium bicarbonate or other alkaline material has been added together with potassium iodide. While salt so treated with separately alkalized tricalcium phosphate and potassium iodide keeps better than salt treated with ordinary tricalcium phosphate, the product compares unfavorably with that of the present invention.

The basic tricalcium phosphate may be added to salt and potassium iodide, then mixed with the compound, or potassium iodide may be added to the salt and the basic tricalcium phosphate added. However, the necessary intimate contact is best secured by mixing the basic tricalcium phosphate and the potassium iodide with each other before adding to the salt.

The stable basic tricalcium phosphate-potassium iodide composition is also suitable for the conditioning and iodization of other food products, for example sugar, powdered milk, other granular or powdered foods or chemicals. Other reasonably stable iodides than potassium iodide may be utilized, but commercially potassium iodide is preferred. The term "potassium iodide" as used in the claims, however, refers to the chemical equivalents of that product.

The term "compound alkaline tricalcium phosphate" as used herein denotes tricalcium phosphate compounded as indicated herein in which the excess alkali is supplied by a wet process at the time of manufacture of the composition as distinguished from a mechanical mixture of the excess alkaline material with tricalcium phosphate.

The foregoing detailed description has been given for clearness of understanding only, and no unnecessary limitations should be understood therefrom.

What I claim as new, and desire to secure by Letters Patent, is:

1. A composition comprising a stable mixture of compound alkaline tricalcium phosphate and a minor amount of potassium iodide, said alkaline tricalcium phosphate having a CaO to $P_2O_5$ molecular ratio of substantially above the normal 3.33 to 1 and a pH value of 10.0 in 1% aqueous suspension.

2. A composition comprising a stable mixture of compound alkaline tricalcium phosphate and a minor amount of potassium iodide, said alkaline tricalcium phosphate having a CaO to $P_2O_5$ substantially above the normal molecular ratio of 3.33 to 1 and a pH value of at least 10 in 1% aqueous suspension.

3. A composition as set forth in claim 2, in which the amount of potassium iodide is at least 0.5% and less than 10% of the composition.

4. A composition as set forth in claim 2, in which the amount of potassium iodide is at least 0.5% and not substantially more than 3% of the composition.

HOWARD ADLER.

REFERENCES CITED

The following references are of record in the file of this patent:

UNITED STATES PATENTS

| Number | Name | Date |
|---|---|---|
| Re. 18,907 | Warning | Aug. 1, 1933 |
| 2,144,150 | Hart et al. | Jan. 17, 1939 |
| 1,869,518 | Smith | Aug. 2, 1932 |
| 2,205,872 | Berry | June 25, 1940 |
| 2,222,830 | Moss | Nov. 26, 1940 |
| 1,978,040 | Daitz | Oct. 23, 1934 |

FOREIGN PATENTS

| Number | Country | Date |
|---|---|---|
| 398,167 | Br. | Aug. 28, 1933 |

OTHER REFERENCES

Industrial & Engineering Chemistry, Feb. 1933, pages 142 through 147 by Moss, Schilb and Warning.